(12) United States Patent
Kim et al.

(10) Patent No.: US 12,333,803 B2
(45) Date of Patent: Jun. 17, 2025

(54) ELECTRONIC DEVICE FOR DISPLAYING AR OBJECT AND METHOD THEREOF

(71) Applicant: Samsung Electronics Co., Ltd., Suwon-si (KR)

(72) Inventors: Hyunwoo Kim, Suwon-si (KR); Jeoungju Kim, Suwon-si (KR); Chanmin Park, Suwon-si (KR); Sangwon Chae, Suwon-si (KR); Sunpil Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 160 days.

(21) Appl. No.: 18/303,972

(22) Filed: Apr. 20, 2023

(65) Prior Publication Data

US 2023/0260280 A1    Aug. 17, 2023

Related U.S. Application Data

(63) Continuation of application No. PCT/KR2022/017773, filed on Nov. 11, 2022.

(30) Foreign Application Priority Data

Jan. 10, 2022  (KR) .......................... 10-2022-0003372
Jan. 21, 2022  (KR) .......................... 10-2022-0009415

(51) Int. Cl.
*G06V 20/20* (2022.01)
*G06F 3/01* (2006.01)
(Continued)

(52) U.S. Cl.
CPC .............. *G06V 20/20* (2022.01); *G06F 3/013* (2013.01); *G06T 11/00* (2013.01); *G06V 10/764* (2022.01)

(58) Field of Classification Search
CPC .............................. G06T 19/006; G06V 20/20
See application file for complete search history.

(56) References Cited

U.S. PATENT DOCUMENTS 9,024,844 B2   5/2015   Vaught et al.
9,922,253 B2   3/2018   Asbun et al.
(Continued)

FOREIGN PATENT DOCUMENTS

JP   2008-228154 A   9/2008
JP      6275087 B2   2/2018
(Continued)

OTHER PUBLICATIONS

International Search Report dated Feb. 23, 2023, issued in International Application No. PCT/KR2022/017773.

*Primary Examiner* — Shivang I Patel
(74) *Attorney, Agent, or Firm* — Jefferson IP Law, LLP

(57) ABSTRACT

An augmented reality device is provided. The augmented reality device includes a display, a camera, a sensor, and at least one processor, wherein the at least one processor is configured to detect a gaze direction of a user by using the sensor, capture a first image in the gaze direction of the user by using the camera, recognize a first object included in the captured first image, generate first object data including first content classification information to which the recognized first object belongs, acquire, based on the first object data, first priority data including a priority for the first content classification information, select, based on the acquired first priority data, a first object of interest among at least one object included in the first image acquired using the camera, and display a first augmented reality content including information on the selected first object of interest.

9 Claims, 11 Drawing Sheets

(51) Int. Cl.
*G06T 11/00* (2006.01)
*G06V 10/764* (2022.01)

(56) References Cited

U.S. PATENT DOCUMENTS

| | | |
|---|---|---|
| 9,996,150 B2 | 6/2018 | Swaminathan et al. |
| 10,126,814 B2 | 11/2018 | Na |
| 10,235,693 B2 | 3/2019 | Byun et al. |
| 10,375,840 B2 | 8/2019 | An et al. |
| 11,340,700 B2 | 5/2022 | Park et al. |
| 11,490,022 B2 | 11/2022 | Lee et al. |
| 11,496,797 B2 | 11/2022 | Xu et al. |
| 2008/0229351 A1 | 9/2008 | Torimaru |
| 2016/0259977 A1* | 9/2016 | Asbun .................... H04W 4/30 |
| 2017/0041597 A1 | 2/2017 | Sugaya |
| 2021/0286504 A1* | 9/2021 | Moore .................... G06F 3/013 |

FOREIGN PATENT DOCUMENTS

| | | |
|---|---|---|
| KR | 10-2016-0013563 A | 2/2016 |
| KR | 10-1850101 B1 | 4/2018 |
| KR | 10-2154912 B1 | 9/2020 |
| KR | 10-2166861 B1 | 10/2020 |
| KR | 10-2021-0019826 A | 2/2021 |
| KR | 10-2021-0024854 A | 3/2021 |

\* cited by examiner

ELECTRONIC DEVICE FOR DISPLAYING AR OBJECT AND METHOD THEREOF

CROSS-REFERENCE TO RELATED APPLICATION(S)

This application is a continuation application, claiming priority under § 365(c), of an International application No. PCT/KR2022/017773, filed on Nov. 11, 2022, which is based on and claims the benefit of a Korean patent application number 10-2022-0003372, filed on Jan. 10, 2022, in the Korean Intellectual Property Office, and of a Korean patent application number 10-2022-0009415, filed on Jan. 21, 2022, in the Korean Intellectual Property Office, the disclosure of each of which is incorporated by reference herein in its entirety.

TECHNICAL FIELD

The disclosure relates to an electronic device for displaying an augmented reality (AR) object and a method thereof. More particularly, the disclosure relates to an electronic device and a method thereof, by which information on a preference of a user provided with an AR service can be efficiently collected.

BACKGROUND ART

Augmented reality technology is a technology derived from virtual reality technology that uses computer graphics technology to generate a virtual space similar to reality. Augmented reality technology refers to a technology that makes a virtual object appear to exist in a real space, by combining the real space (reality) and a virtual space. This augmented reality technology superimposes a virtual image over a real space and is thus mainly used to provide additional information on an object in the real space.

An electronic device that provides augmented reality may acquire a preview image of a real object via a camera, and may recognize (or identify) the real object, based on the acquired preview image. The electronic device may display information on augmented reality (e.g., a virtual object) on the preview image, based on the recognized object. The electronic device may provide augmented reality to a user via, for example, a game application or a camera application, and may provide the augmented reality to the user to share the same with other users.

The above information is presented as background information only to assist with an understanding of the disclosure. No determination has been made, and no assertion is made, as to whether any of the above might be applicable as prior art with regard to the disclosure.

DISCLOSURE

Technical Problem

AR object information or augmented reality contents provided by an augmented reality device may provide a lot of unnecessary information regardless of an interest level of a user of the augmented reality device.

In order to increase a user's experience, the augmented reality device may be required to select and provide information having a high level of interest to the user of the augmented reality device. However, the augmented reality device may have a limitation in selecting only information having a high level of interest to the user. For example, since criteria for identifying information with a high level of interest to a user may be different for each user, the augmented reality device may have a limitation in selecting only information with a high level of interest to a user.

Aspects of the disclosure are to address at least the above-mentioned problems and/or disadvantages and to provide at least the advantages described below. Accordingly, an aspect of the disclosure is to provide an augmented reality device that selectively provides only information desired by a user.

Additional aspects will be set forth in part in the description which follows and, in part, will be apparent from the description, or may be learned by practice of the presented embodiments.

Technical Solution

In accordance with an aspect of the disclosure, an augmented reality device is provided. The augmented reality device includes a display, a camera, a sensor, and at least one processor operatively connected to the display, the sensor, and the camera, wherein the at least one processor is configured to detect a gaze direction of a user by using the sensor, capture a first image in the gaze direction of the user by using the camera, recognize a first object included in the captured first image, generate first object data including first content classification information to which the recognized first object belongs, acquire, based on the first object data, first priority data including a priority for the first content classification information, select, based on the acquired first priority data, a first object of interest among at least one object included in the first image acquired using the camera, and display a first augmented reality content including information on the selected first object of interest.

In accordance with another aspect of the disclosure, an augmented reality device is provided. The augmented reality device includes a display, a sensor, a camera, and at least one processor operatively connected to the display, the sensor, and the camera, wherein the at least one processor is configured to detect a gaze of a user by using the sensor, acquire a first image in a tracked gaze direction of the user by using the camera, generate objects in the acquired first image and first object data related to the gaze of the user with respect to the objects, transmit the generated first object data to a server, receive, from the server, common priority data generated by the server, based on the first object data provided to the server from the augmented reality device and other object data provided to the server from at least one other augmented reality device, generate private (individualized) priority data for the user of the augmented reality device from the common priority data by using the first object data generated by the augmented reality device, select, based on the private priority data, a first object of interest of the user from among the objects in the first image, and display an augmented reality content including the first object of interest and additional information on the first object of interest.

In accordance with another aspect of the disclosure, a method of operating an augmented reality device is provided. The method includes detecting a gaze of a user by using a sensor, acquiring a first image in a detected gaze direction of the user by using a camera, generating information of real objects in the acquired first image and first object data related to the gaze of the user with respect to the real objects, transmitting the generated first object data to a server, receiving, from the server, common priority data generated by the server, based on the first object data provided to the server from the augmented reality device and other object data provided to the server from at least one other augmented reality device, generating private (individualized) priority data for the user of the augmented reality device from the common priority data by using the object data generated by the augmented reality device, selecting, based on the private priority data, a first object of interest of the user from among the objects in the first image, and displaying an augmented reality content including the first object of interest and additional information on the first object of interest.

Advantageous Effects

An electronic device and a method thereof according to various embodiments disclosed in the document can selectively display only information in which a user using an augmented reality device is highly interested.

According to various embodiments disclosed in the document, an electronic device and a method thereof, by which information on a preference of a user provided with an augmented reality service can be efficiently collected, can be provided.

According to various embodiments of the disclosure, the augmented reality device may exclude information unnecessary to a user.

According to various embodiments of the disclosure, the augmented reality device may identify information, in which a user is highly interested, based on consistent information.

According to various embodiments of the disclosure, the augmented reality device may additionally provide information desired by a third party providing an advertisement while concurrently providing information in which a user is highly interested.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize various changes and modifications of the various embodiments described herein can be made without departing from the scope and spirit of the disclosure of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
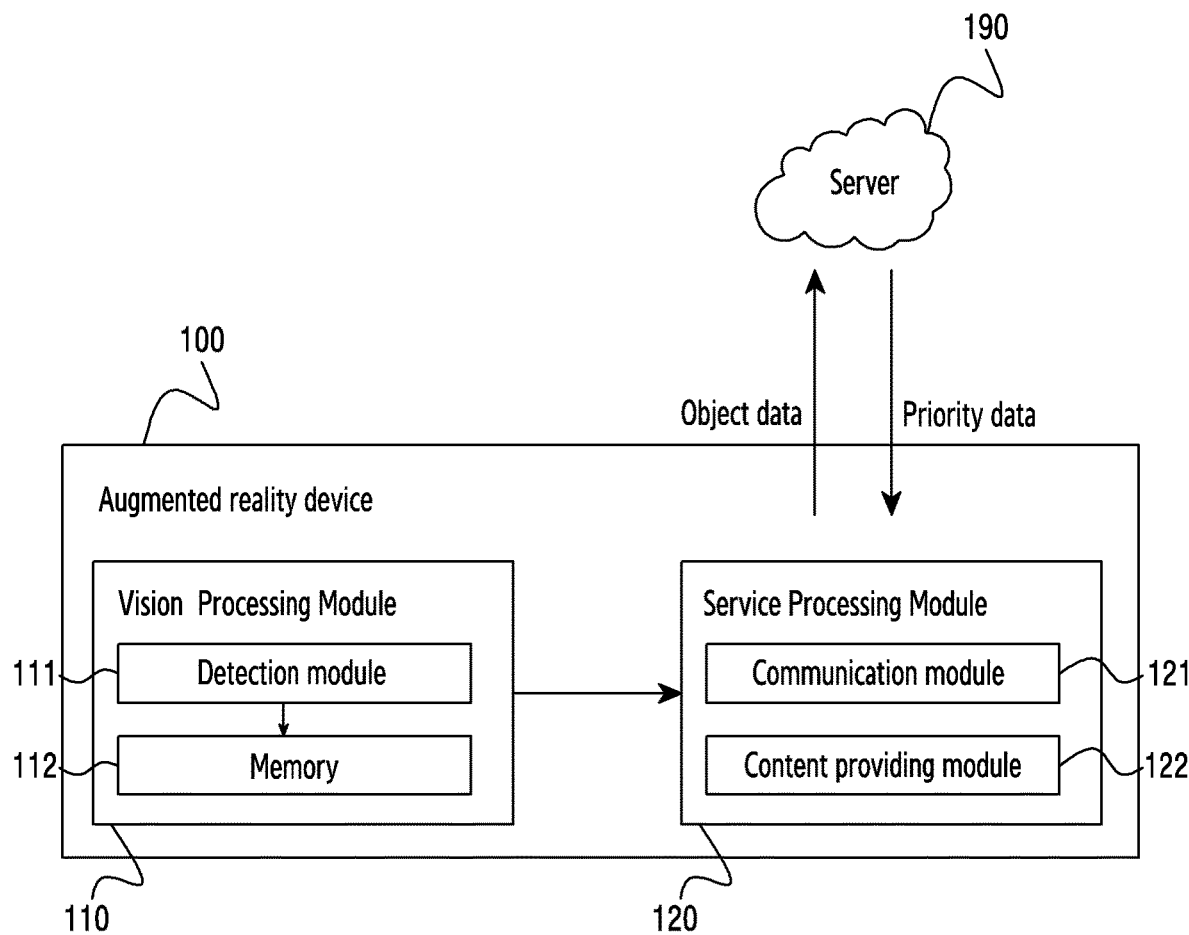
FIG. 1 is a diagram illustrating an electronic device and a server according to an embodiment of the disclosure.

FIG. 1 is a diagram illustrating an augmented reality device and a server according to an embodiment of the disclosure.

Referring to FIG. 1, according to an embodiment of the disclosure, an augmented reality device 100 may include a vision processing module 110 and a service processing module 120.

The vision processing module 110 of the augmented reality device 100 may be configured as a module including an element related to a user's vision, such as a camera module and a frame work. For example, the vision processing module 110 may be configured as a module that stores information on a real object included in an augmented reality scene provided by the augmented reality device 100.

According to an embodiment of the disclosure, a real object, which will be described later, appears in an image or video captured via a camera module, and may refer to a subject recognized by a sensor or at least one processor. For example, the real object may refer to a person appearing in an image captured via the camera module.

According to an embodiment of the disclosure, the service processing module 120 of the augmented reality device 100 may be configured as the service processing module 120 that exchanges information stored in the augmented reality device 100 with a server 109. For example, the service processing module 120 may be configured as a module which selects, together with the server 190, only an object of interest that a user of the augmented reality device 100 prefers with respect to a real object recognized by the user, or communicates with the server 190.

According to an embodiment of the disclosure, the vision processing module 110 may include a detection module 111 configured to recognize a real object, and a memory 112. In an example, the detection module 111 may be configured as a module that recognizes a real object via an image acquired by a camera of the augmented reality device 100. For example, the detection module 111 may include a camera and a sensor. In an example, the memory 112 may be configured as a module that stores information on the recognized real object.

According to an embodiment of the disclosure, the service processing module 120 may include a communication module 121 and a content providing module 122.

According to an embodiment of the disclosure, the communication module 121 may be configured as a module that communicates with an external electronic device or the server. In an example, the communication module 121 may be configured as a module that provides the server 190 with object data to be described later, or receives priority data generated by the server 190.

According to an embodiment of the disclosure, the content providing module 122 may be configured as a module that provides the augmented reality device with information received from the external electronic device or the server. For example, the content providing module 122 may be configured as a module that provides an AR object or an augmented reality content preferred by a user of the augmented reality device 100 to the user, based on priority data received from the server.

According to an embodiment of the disclosure, the augmented reality device 100 may include the vision processing module 110 and the service processing module 120 so as to provide the user with information of a place that the user looks at or information on an object in an image in the user's field of view via tracking a gaze of the user.

According to an embodiment of the disclosure, the description of the modules constituting the augmented reality device 100 has been provided by taking the vision processing module 110 and the service processing module 120 as examples, but the disclosure is not limited thereto. For example, the content providing module 122 of the service processing module 120 may further include a display module that visually provides an augmented reality content to a user.

According to an embodiment of the disclosure, the server 190 may communicate with the augmented reality device 100 via a communication module so as to transmit and receive information of the augmented reality device 100.

According to an embodiment of the disclosure, the server 190 may include multiple pieces of data. In an example, the server 190 may receive and store object data for a real object from the augmented reality device 100. For example, the augmented reality device 100 may generate first object data including information on a recognized first object, so as to transmit the same to the server. For example, the server 190 having received the first object data may store the first object data in the server.

According to an embodiment of the disclosure, the server 190 may generate priority data obtained by selecting a priority of a real object preferred by a user, based on the received object data so as to provide the same to the augmented reality device 100. In other words, the server 190 may be configured by a module that generates priority data for selecting an object of interest, in which a user is highly interested, from among multiple real objects recognized by the augmented reality device 100.

According to an embodiment of the disclosure, although the procedure of generating object data and priority data has been described with reference to the relationship between the augmented reality device 100 and the server 190, the disclosure is not limited thereto. For example, the augmented reality device 100 may not transmit object data to the server 190, and the augmented reality device 100 itself may generate priority data, based on the first object data for the first object.

Specific examples of object data and priority data will be described with reference to FIGS. 4 to 10.

Figure 2:
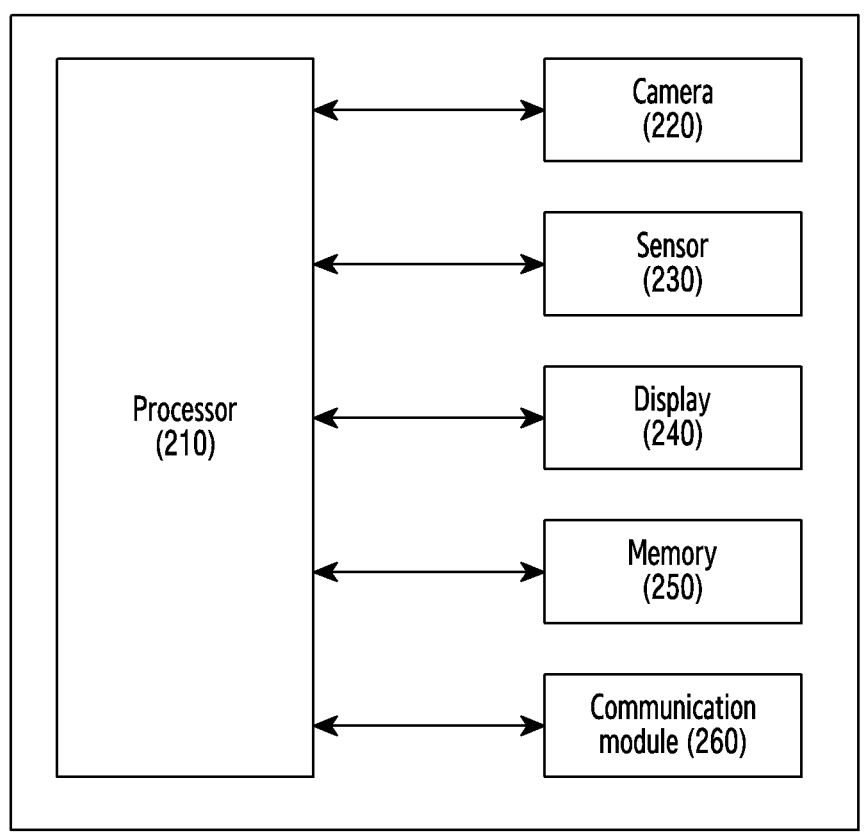
FIG. 2 is a block diagram of an electronic device according to an embodiment of the disclosure.

FIG. 2 is a block diagram of an electronic device according to an embodiment of the disclosure.

Referring to FIG. 2, the augmented reality device 100 may include a processor 210, a camera 220, a sensor 230, a display 240, a memory 250, and/or a communication module 260. In various embodiments of the disclosure, the augmented reality device 100 may include an additional element in addition to the elements illustrated in FIG. 2, or may omit at least one of the elements illustrated in FIG. 2.

According to an embodiment of the disclosure, the processor 210 may execute an operation or data processing related to control and/or communication of at least one other element of the augmented reality device 100, by using instructions stored in the memory 250. According to an embodiment of the disclosure, the processor 210 may include at least one of a central processing unit (CPU), a graphics processing unit (GPU), a micro controller unit (MCU), a sensor hub, a supplementary processor, a communication processor, an application processor, an application-specific integrated circuit (ASIC), and field programmable gate arrays (FPGA), and may have multiple cores.

According to an embodiment of the disclosure, the processor 210 may execute an application (e.g., an augmented reality application) stored in the memory 250. According to an embodiment of the disclosure, the processor 210 may acquire an image by using the camera 220 while an augmented reality application is running. According to an embodiment of the disclosure, the processor 210 may provide an augmented reality (AR) object that is superimposed on or floating on an image while the augmented reality application is running. Applications described in the specification are not limited to the augmented reality application, and may be any application using the camera 220.

According to an embodiment of the disclosure, the processor 210 may analyze the image to determine a position (e.g., coordinates) at which the AR object is to be displayed. For example, the processor 210 may distinguish an object (e.g., a person) and a background included in the image or may extract feature points related to the image. According to an embodiment of the disclosure, the processor 210 may identify (or recognize) a person's eye, nose, mouth, head, torso, or gesture (or posture) included in the image, based on the extracted feature points. According to an embodiment of the disclosure, the processor 210 may identify (or recognize) the color or size of fruit included in the image, based on the extracted feature points. According to an embodiment of the disclosure, the processor 210 may display the AR object corresponding to a configuration of the image (e.g., a background, a person, or a motion) at a position corresponding to the configuration.

According to an embodiment of the disclosure, the processor 210 may store the image and information on the AR object related to the image in the memory 250, based on acquisition (or capturing) of the image (e.g., a still image, and a moving image or a video) via the augmented reality application. For example, the information on the AR object related to the video may include a type and coordinates of the AR object to be displayed for each frame of the video. Details related to an operation of the processor 210 will be described later with reference to FIG. 4.

According to an embodiment of the disclosure, the camera 220 may acquire (or capture) an image (e.g., a still image and a moving image). For example, an image signal processor (not shown) electrically connected to the camera 220 may distinguish an object (e.g., a person) and a background included in an image (e.g., a preview image or an image stored in the memory 250). The image signal processor may extract feature points related to the image (e.g., a preview image or an image included in the memory 250). According to an embodiment of the disclosure, the feature points may be used to identify (or recognize) the face (e.g., an eye, a nose, a mouth, or the like) or motion (or posture) of a person included in the image. The image signal processor may be separate from the camera 220 or may be implemented as a part of the processor 210. According to an embodiment of the disclosure, the camera 220 may include an image sensor. According to an embodiment of the disclosure, the image sensor may acquire and process color information.

According to an embodiment of the disclosure, the sensor 230 may detect at least one of a posture and a position of the augmented reality device 100. According to an embodiment of the disclosure, the sensor 230 may measure a physical quantity and convert the same into an electrical signal or generate a data value. According to an embodiment of the disclosure, the sensor 230 may detect a posture or a change in a posture of the augmented reality device 100 by using the electrical signal or the data value. According to an embodiment of the disclosure, the sensor 230 may include at least one of a gyro sensor (or gyroscope), a gravity sensor, a geomagnetic sensor, or an acceleration sensor. According to various embodiments of the disclosure, the gyro sensor, the gravity sensor, the geomagnetic sensor, the acceleration sensor, or a combination of two or more thereof may perform operations of the sensor 230 by detecting a rotation of the augmented reality device 100, a change in the orientation of the augmented reality device 100, or a tilt of the augmented reality device 100.

According to an embodiment of the disclosure, the sensor 230 may be operatively connected to the processor 210, the camera 220, or the memory 250 so as to perform processing relating to color information, three dimensional (3D) information, distance information, or location information.

According to an embodiment of the disclosure, the communication module 260 may establish a communication link between the augmented reality device 100 and an external electronic device (e.g., a server related to providing of an AR object) and may perform communication via the established communication link. According to an embodiment of the disclosure, the communication module 260 may transmit, to the server 190, detecting information including at least one of posture information and position information of the augmented reality device 100, scene information acquired via the camera 220, and/or virtual object information generated according to a user input. According to an embodiment of the disclosure, the communication module 260 may receive, from the server 190, detecting information including at least one of posture information and position information of the augmented reality device 100, scene information acquired via the camera 220, and/or virtual object information generated according to a user input.

According to an embodiment of the disclosure, the display 240 may display an image acquired via the camera 220. According to an embodiment of the disclosure, the display 240 may display an AR object that is superimposed on or floating on the image. According to an embodiment of the disclosure, the augmented reality device 100 may acquire a user's input via the display 240 and may transfer the user's input to the processor 210.

According to an embodiment of the disclosure, the memory 250 may refer to one or more memory sets. According to an embodiment of the disclosure, the memory 250 may store data and/or commands received from or generated by other elements (e.g., the processor 210, the camera 220, the sensor 230, the display 240, or the communication module 260). In various embodiments of the disclosure, the memory 250 may store an application (e.g., the augmented reality application) using the camera 220. According to an embodiment of the disclosure, the memory 250 may store multiple AR objects.

Figure 3:
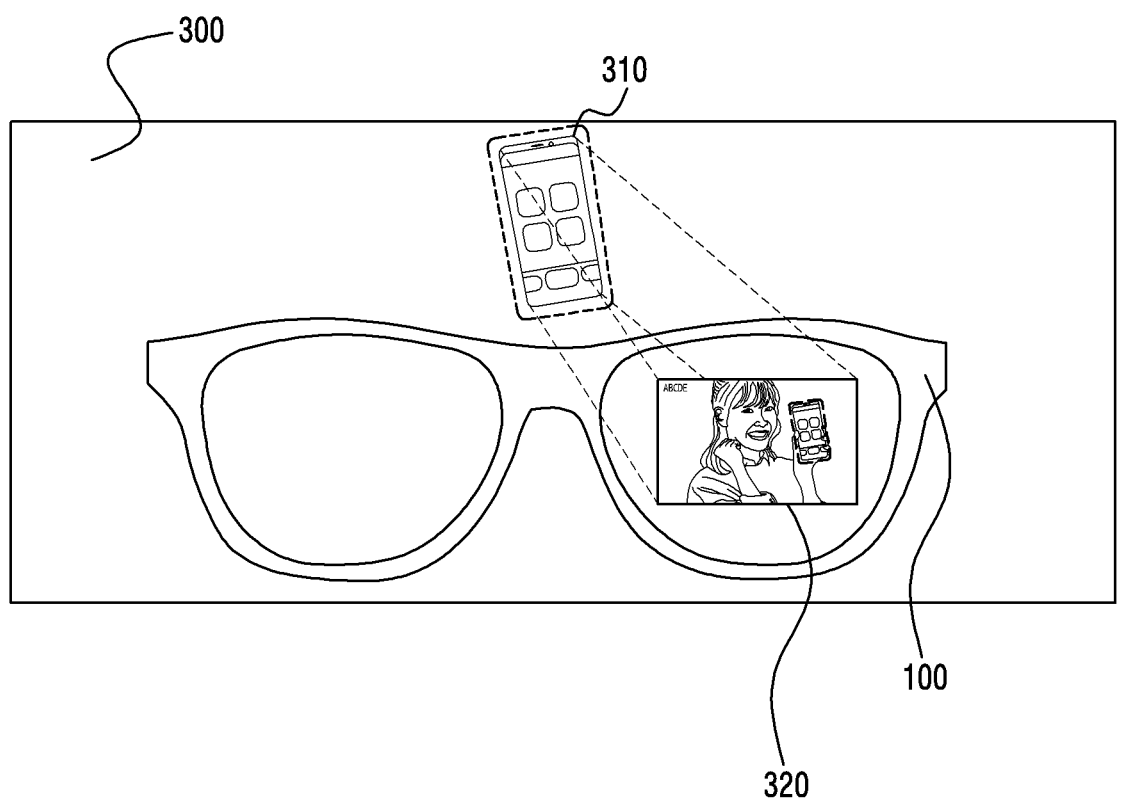
FIG. 3 illustrates an augmented reality device according to an embodiment of the disclosure.

FIG. 3 illustrates the augmented reality device according to an embodiment of the disclosure.

According to an embodiment of the disclosure, FIG. 3 illustrates an image of real world 300 viewed through the augmented reality device 100.

Referring to FIG. 3, the augmented reality device 100 may provide an augmented reality content 320 for the real world 300.

According to an embodiment of the disclosure, the augmented reality device 100 may be configured as augmented reality glasses in the shape of glasses worn on a face part of a user, but is not limited thereto. For example, the augmented reality device 100 may be configured as an augmented reality helmet or a head mounted display device (HMD) worn on a head part.

As another example, the augmented reality device 100 may be a device that displays, via a display, a screen in which an augmented reality object is overlapped on an image acquired using a camera. For example, the augmented reality device 100 may include a portable communication device (e.g., a smartphone), a computer device, a portable multimedia device, a portable medical device, a camera, a wearable device, or a home appliance device.

According to an embodiment of the disclosure, the augmented reality device 100 may display the augmented reality content 320 for a real object 310. In an example, the augmented reality content 320 may include an advertisement image for the real object 310.

For example, when a user looks at an electronic device (e.g., a smartphone) in the real world 300, the augmented reality device 100 may display the augmented reality content 320 related to the advertisement image of the electronic device.

The description of the augmented reality content 320 provided by the augmented reality device 100 illustrated in FIG. 3 has been provided by taking one advertisement as an example, but the disclosure is not limited thereto. For example, the augmented reality device 100 may display multiple advertisements. As another example, the augmented reality device 100 may display the augmented reality content 320, such as the size and price of the real object 310.

Figure 4:
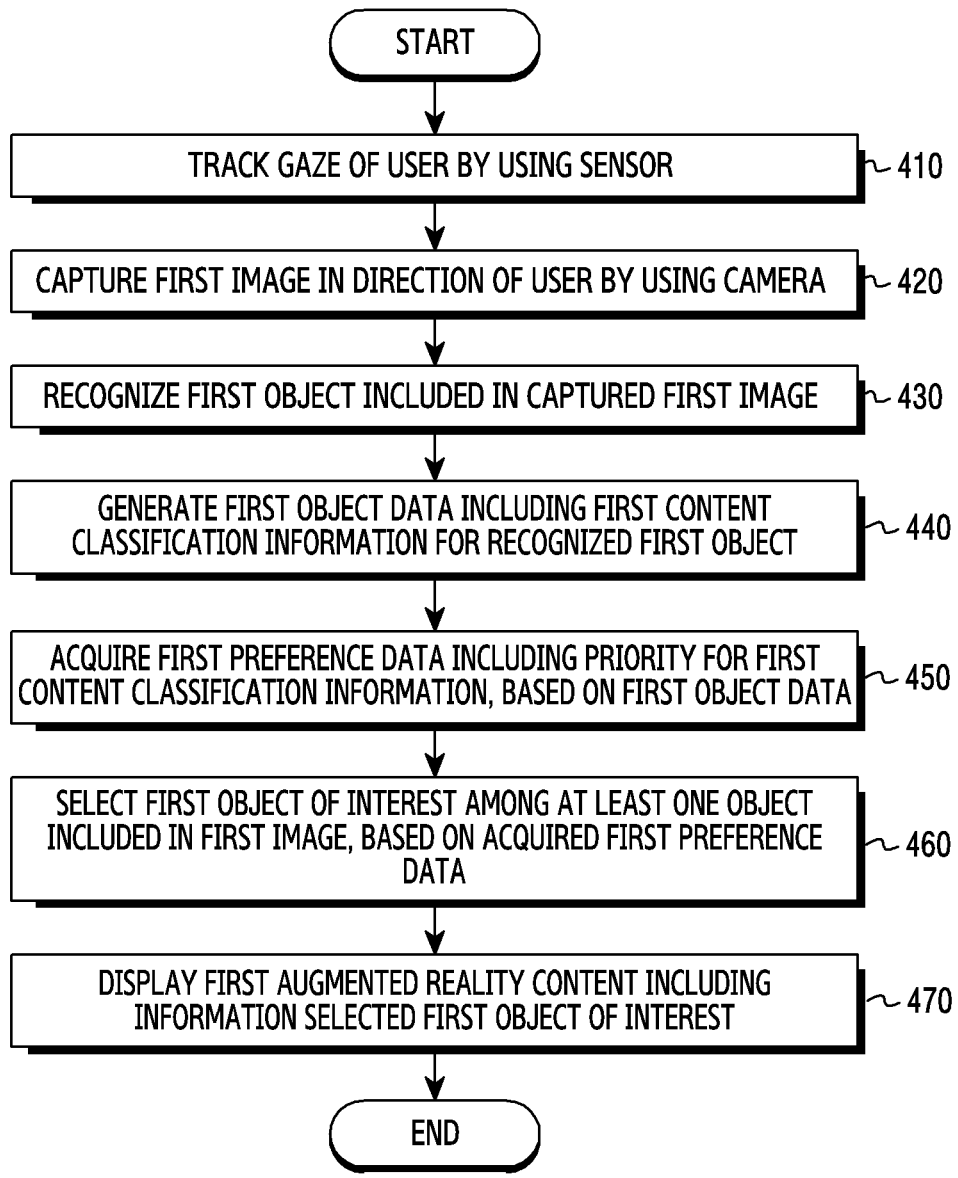
FIG. 4 is a flowchart illustrating displaying of an augmented reality content according to an embodiment of the disclosure.

FIG. 4 is a flowchart illustrating displaying of an augmented reality content by an augmented reality device according to an embodiment of the disclosure.

According to an embodiment of the disclosure, the augmented reality device 100 may include a processor 210, a camera 220, the sensor 230, the display 240, the memory 250, and the communication module 260.

According to an embodiment of the disclosure, the processor 210 may be operatively connected to the display 240, the sensor 230, and the camera 220.

Referring to FIG. 4, in operation 410, the processor 210 according to an embodiment may detect a gaze of a user of the augmented reality device 100 by using the sensor 230. In an example, the processor 210 may detect a gaze direction viewed by the user of the augmented reality device 100 by using the sensor 230 that tracks the gaze of the user. For example, the sensor 230 may detect the gaze direction of the user by using a light reflector and a light receiver located inside the augmented reality device 100.

According to an embodiment of the disclosure, in operation 420, the processor 210 may capture a first image in the gaze direction by using the camera 220. According to an embodiment of the disclosure, the first image may refer to an image of the real world 300 illustrated in FIG. 3. In an example, the processor 210 may capture the first image including the real object 310 (e.g., furniture, home appliance, wall, and background) located in the gaze direction of the user by using the camera 220.

According to an embodiment of the disclosure, in operation 430, the processor 210 may recognize a first object included in the captured first image. According to an embodiment of the disclosure, the first object may refer to the real object 310 illustrated in FIG. 3. In an example, the captured first image may include multiple real objects, and the processor 210 may recognize the first object 310 from among the multiple real objects of the first image. For example, the processor 210 may recognize the first object by identifying a color of the first object 310, a background of the first object 310, and/or motion of the first object 310.

According to an embodiment of the disclosure, in operation 440, the processor 210 may generate first object data for the recognized first object 310. In an embodiment of the disclosure, the first object data may include information on the first object 310 among multiple objects in the acquired first image. For example, the first object data may include the first object 310 information and first content classification information of the first object.

According to an embodiment of the disclosure, the first content classification information may include information obtained by categorizing and classifying, based on the first object data, the first object included in the first image into multiple levels. For example, if the first object is an apple, the first content classification information may include information obtained by categorization and classification into apple, fruit that is a higher concept than apple, and food that is a higher concept than fruit.

According to an embodiment of the disclosure, information of the first object 310 may include color information of the first object 310. For example, if the first object 310 is a red apple, the first object data may include a type (e.g., fruit) and a color (e.g., red) of the apple that is the first object.

According to an embodiment of the disclosure, the first object data may further include information on the gaze of the user with respect to the first object 310. For example, the information on the gaze of the user with respect to the first object 310 may include information on a time in which the user of the augmented reality device 100 gazes at the first object 310 and/or information on a frequency at which the user gazes at the first object 310.

For example, if the first object 310 is a red apple, the first object data may include information on the time in which the user gazes at the apple and/or the frequency at which the user gazes at the apple.

The information on the first object data has been described by taking an apple as an example, but is not limited thereto. For example, if the first object is a smartphone, the first object data may include a type of the smartphone (e.g., electronic device), a color of the smartphone (e.g., black), and a time in which the user gazes at the smartphone. For another example, if the first object is a pencil, the first object data may include a type of pencil (e.g., writing instruments), a color of the pencil (e.g., blue), and a time in which the user gazes at the pencil.

The information on the gaze of the user with respect to the first object 310 has been described by taking time and frequency as examples, but is not limited thereto. The information on the gaze of the user may further include a period during which the user gazes at the first object 310.

A specific embodiment of the first object data will be described with reference to FIG. 5.

According to an embodiment of the disclosure, in operation 450, the processor 210 may acquire first priority data generated based on the first object data. In an example, the processor 210 may acquire the first priority data including priority information on the first content classification information, which is generated based on the first object data.

In other words, according to an embodiment of the disclosure, the first priority data may include a priority for the first content classification information. For example, the first priority data may include information obtained by ranking, based on the first object data, each piece of content classification information to which each of objects belongs.

For example, each piece of content classification information may include each content related to food, automobiles, and games, and the first priority data may include information in which each content is ranked based on a recognition time and a recognition period of the user, which are included in the first object data.

A specific embodiment related to content ranking information will be described with reference to FIG. 6.

According to an embodiment of the disclosure, in operation 460, the processor 210 may select a first object of interest from among at least one object included in the first image acquired using the camera 220, based on the acquired first priority data. In an example, the processor 210 may select the first object of interest belonging to the content classification information having a highest priority from among multiple pieces of content classification information, based on the first priority data. In other words, in operation 460, the processor 210 may select an object of interest, in which the user of the augmented reality device 100 is most interested, based on the first priority data.

According to an embodiment of the disclosure, the object of interest may be an object substantially different from the recognized first object among the multiple objects of the first image. As another example, the object of interest may be substantially the same object as the first object.

According to an embodiment of the disclosure, in operation 470, the processor 210 may display an augmented reality content for the selected first object of interest. In an example, if an apple is selected as the first object of interest, the processor 210 may display an augmented reality content related to fruit. In another example, if a refrigerator is selected as the first object of interest, the processor 210 may display an augmented reality content related to a home appliance.

According to an embodiment of the disclosure, the augmented reality content may include the first object of interest and additional information on the first object of interest. In an example, the augmented reality content may include information of the first object of interest and/or information of another object belonging to the content classification information substantially the same as that of the first object of interest. For example, if an apple is selected as the first object of interest, an augmented reality content of fruit may include information on the apple and information on a banana or a strawberry belonging to the content classification information of fruit.

The first object of interest has been described by taking an apple as an example, but is not limited thereto. In another example, if a pencil is selected as the object of interest, an augmented reality content of writing instruments may include information on the pencil and/or information on an eraser or a pencil case belonging to the content classification information of writing instruments.

According to an embodiment of the disclosure, the processor 210 may display only a first augmented reality content including information on the selected first object of interest.

According to an embodiment of the disclosure, by exposing only an augmented reality content, in which the user is most interested, on the display 240, the processor 210 may selectively provide only information desired by the user and may exclude unnecessary information. Based on this, experiences of the user using the augmented reality device 100 may be increased.

Figure 5:
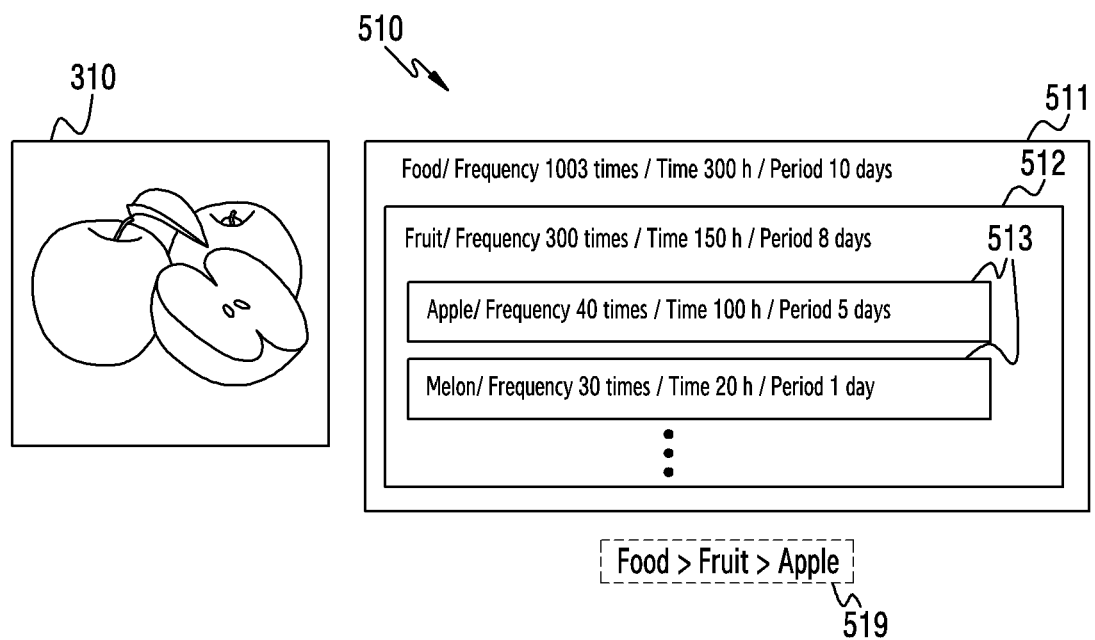
FIG. 5 illustrates object data of an augmented reality device according to an embodiment of the disclosure.

FIG. 5 illustrates object data of an augmented reality device according to an embodiment of the disclosure.

Referring to FIG. 5, according to an embodiment of the disclosure, the processor 210 may generate and store first object data 510 for the first object 310 in the first image captured by the camera 220.

According to an embodiment of the disclosure, the first object 310 refers to an object recognized by a user via the augmented reality device 100 in the real world. According to an embodiment of the disclosure, the first object 310 of FIG. 5 may refer to the first object 310 of FIG. 3.

According to an embodiment of the disclosure, the first object data 510 may include first content classification information 519 obtained by categorizing the first object 310.

According to an embodiment of the disclosure, the first content classification information may include information obtained by categorizing and classifying, based on the first object data, the first object included in the first image into multiple levels.

According to an embodiment of the disclosure, the first object may be stored for each category in the first content classification information 519. In an example, category information on the first object 310 may be gradually stored from a large category to a small category in the first object data 510. For example, if the object recognized by the processor 210 by using the camera 220 is an apple, the processor 210 may store the object as food in a first category 511. The processor 210 may store the object as fruit in a second category 512, and may store the object as an apple in a third category 513.

In another example, if the object recognized by the processor 210 by using the camera 220 is a pencil, the processor 210 may store the object as stationary in the first category 511, may store the object as writing instruments in the second category 512, and may store the object as a pencil in the third category 513.

According to an embodiment of the disclosure, the first object data 510 may further include gaze information for the first object 310. In an example, the gaze information for the first object 310 may include a frequency at which the user of the augmented reality device 200 gazes at the first object 310, a time in which the user gazes at the first object 310, and a period during which the user gazes at the first object 310.

According to an embodiment of the disclosure, the gaze information for the first object 310 may be stored corresponding to category information of the first object 310 in the first object data 510. In an example, gaze information for the first object 310 may be stored corresponding to the category of the first object 310. For example, if the object recognized by the processor 210 by using the camera 220 is an apple, gaze information relating to 1003 times of a frequency, 300 hours of time, and 10 days of period for recognition as food may be stored in the first category 511 indicating food. For example, in the second category 512 indicating fruit, gaze information relating to 300 times of a frequency for recognition as fruit, 150 hours of recognition time, and 8 days of recognition period may be stored. For example, in the third category 513 indicating an apple, gaze information relating to 40 times of a frequency for recognition as an apple, 100 hours of recognition time, and 5 days of recognition period may be stored.

According to an embodiment of the disclosure, the first object data 510 may further include information on whether the user interacts with the first object 310. In an example, the information on whether the user interacts with the first object 310 may further include information on whether the user of the augmented reality device 100 has searched for the first object 310 and/or information on whether the user has made contact with the first object 310 in the real world. In other words, the information on whether the user interacts with the first object may refer to reaction information between the user and the first object 310, in addition to the gaze information for the first object.

According to an embodiment of the disclosure, the processor 210 may transmit information on the generated first object data 510 to the server 190. In an example, the processor 210 may transmit the first object data 510 to the server in order to generate first priority data.

As another example, the processor 210 may generate first priority data by using the generated first object data 510.

A specific embodiment of the first priority data will be described with reference to FIG. 6.

Figure 6:
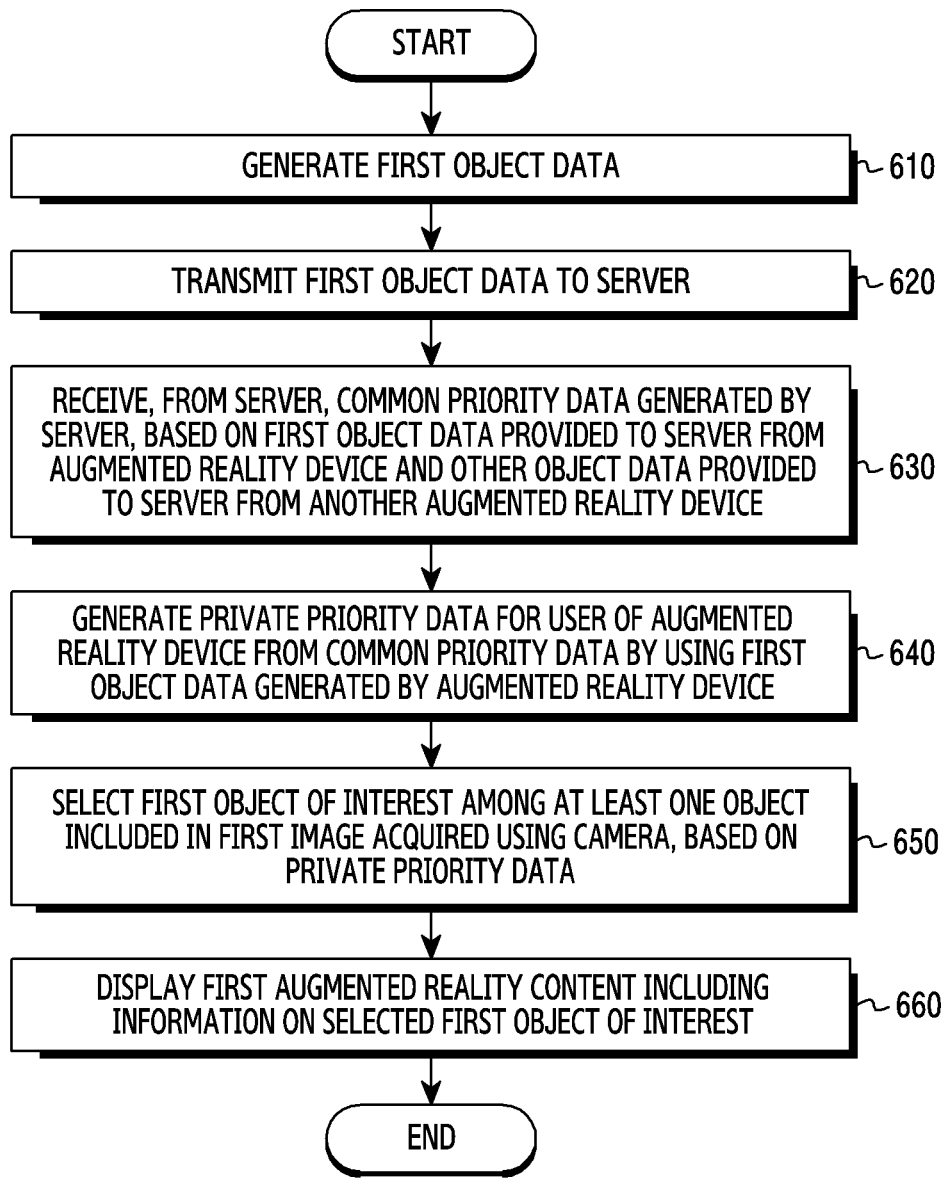
FIG. 6 is a flowchart illustrating generating of priority data according to an embodiment of the disclosure.

FIG. 6 is a flowchart illustrating generating of priority data according to an embodiment of the disclosure.

Referring to FIG. 6, according to an embodiment of the disclosure, in operation 610, the processor 210 may generate a first object data. Operation 610 of generating first object data of FIG. 6 may refer to operations 410 to 450 of FIG. 4.

According to an embodiment of the disclosure, in operation 620, the processor 210 may transmit the first object data 510 to the server.

According to an embodiment of the disclosure, in operations 630 and 640, the processor 210 may acquire priority data generated based on the first object data 510. For example, the server 190 may generate priority data based on the first object data 510, and the processor 210 may acquire, from the server 190, the priority data generated by the server 190.

According to an embodiment of the disclosure, the priority data may include information obtained by ranking, based on the first object data 510, the first object 310 or first content classification information 519 to which the first object 310 belongs. For example, the priority data may include a frequency at which the first object 310 is recognized, a time in which the first object 310 is recognized, and/or information obtained by ranking, based on the frequency at which the first object 310 is recognized, the first object 310 or the first content classification information to which the first object 310 belongs.

According to an embodiment of the disclosure, the priority data may include common priority data and private (individualized) priority data.

According to an embodiment of the disclosure, in operation 630, the processor 210 may receive, from the server 190, common priority data generated by the server 190, based on the first object data 510 provided to the server 190 from the augmented reality device 100 and other object data provided to the server 190 from at least one other augmented reality device 180.

For example, the server 190 may generate common priority data, based on the first object data 510 provided to the server 190 from the augmented reality device 100 and other object data provided to the server 190 from at least one other augmented reality device 180.

According to an embodiment of the disclosure, the common priority data may include priority information determined based on common input information of the user of the augmented reality device 100 and a user of another augmented reality device. For example, the common priority data may include priority information determined based on gender, age groups, and race of users, which are input by the user of the augmented reality device 100 and the user of another augmented reality device.

The common input information has been described by taking gender, age groups, and race as examples, but is not limited thereto. For example, the common priority data may further include information on religions of users.

In other words, the common priority data may include input static information that does not change in real time.

According to an embodiment of the disclosure, in operation 640, the processor 210 may generate private (individualized) priority data for the user of the augmented reality device 100 from the common priority data by using the first object data 510 generated by the augmented reality device 100.

According to an embodiment of the disclosure, the private priority data may include priority information determined based on gaze information obtained by recognizing the object in real time by the user of the augmented reality device 100. For example, the private priority data may include priority information determined based on information on a time when the user recognized the object. In other words, the private priority data may include dynamic information that changes in real time according to the user's gaze.

According to an embodiment of the disclosure, the processor 210 may generate private priority data, based on recognition times for all objects recognized by the user, but the disclosure is not limited thereto. For example, if a first time value for recognition of the object exceeds a predetermined reference time value, the processor 210 may generate private priority data based on the first time value. However, for example, if a second time value for recognition of the object is smaller than or equal to the predetermined reference time value, the processor 210 may not generate private priority data based on the second time value.

As the processor 210 selectively generates the private priority data, based on the reference time value, power of the augmented reality device 100 may be saved, and first priority data may be quickly generated.

Table 1 shows an example of the first priority data obtained by ranking the content classification information 519.

TABLE 1

| Priority | Content classification information | Exposure information on display |
|---|---|---|
| 1 | Food | Exposure |
| 2 | Vehicle | Exposure |
| 3 | Advertisement | Conditional exposure |
| 4 | Game | Exposure |
| . . . | | |
| 99 | Alcohol | Non-exposure |
| 100 | Gambling | Non-exposure |

Referring to Table 1 according to an embodiment of the disclosure, the priority data may include priority information corresponding to each piece of content classification information 519. According to an embodiment of the disclosure, the first priority data may be obtained by ranking the first content classification information according to the user's level of interest so as to be stored. For example, an augmented reality content that the user of the augmented reality device 100 prefers the most may be food.

According to an embodiment of the disclosure, the priority data may further include exposure information on the display for the content classification information 519. In an example, the priority data may include exposure information on the display, which is identified based on the user's age and information input to the augmented reality device 100 by the user. For example, if the user's age is 19 years or younger, an augmented reality content related to alcohol and/or gambling may not be displayed on the display even if priorities are high. In another example, if the user of the augmented reality device 100 blocks exposure of an advertisement via an application configuration, an augmented reality content related to the advertisement may not be displayed on the display even if a priority is high.

In other words, according to an embodiment of the disclosure, the processor 210 may identify a displayed augmented reality content, based on the user's age and exposure-related configuration information input by the user to an application of the augmented reality device 100.

According to an embodiment of the disclosure, in operation 650, the processor 210 may select a first object of interest from among at least one object included in the first image acquired using the camera 220, based on the acquired first priority data.

According to an embodiment of the disclosure, in operation 660, the processor 210 may display an augmented reality content for the selected first object of interest.

Figure 7:
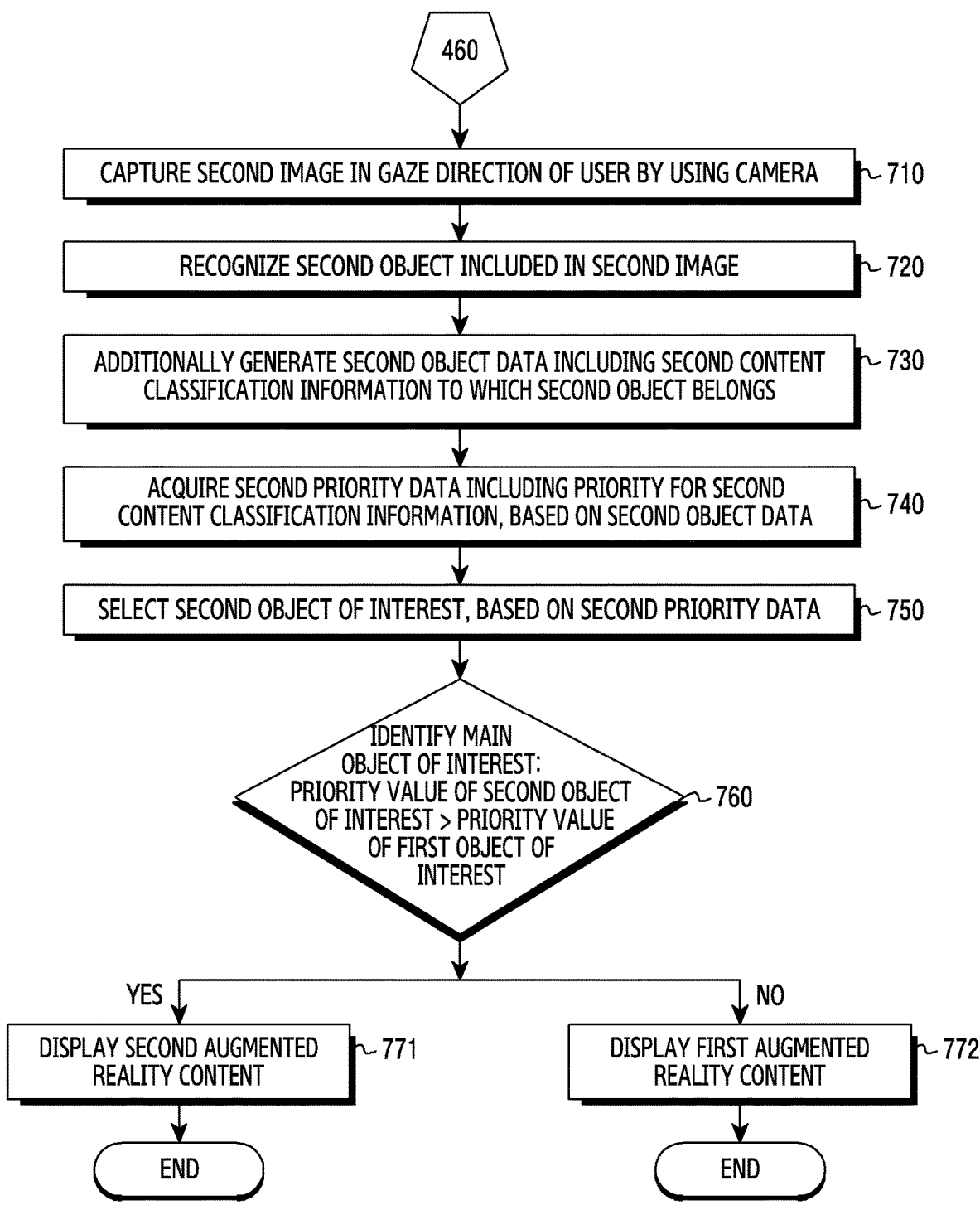
FIG. 7 is a flowchart illustrating displaying of an augmented reality content according to an embodiment of the disclosure.

FIG. 7 is a flowchart illustrating displaying of an augmented reality content according to an embodiment of the disclosure.

Referring to FIG. 7, according to an embodiment of the disclosure, FIG. 7 illustrates a flowchart illustrating displaying of an augmented reality content according to the user recognizing a new second object, unlike the flowchart of FIG. 4.

According to an embodiment of the disclosure, in operation 710, the processor 210 may capture a second image in a gaze direction by using the camera 220. In an example, the processor 210 may capture the second image including a real object (e.g., furniture, home appliance, wall, and background) located in the gaze direction of the user by using the camera 220. According to an embodiment of the disclosure, the second image of FIG. 7 may be an image distinct from the first image of FIG. 4, but is not limited thereto. For example, the image of FIG. 7 may partially overlap the first image of FIG. 4.

According to an embodiment of the disclosure, in operation 720, the processor 210 may recognize a second real object included in the captured second image. In an example, the captured second image may include multiple real objects, and the processor 210 may recognize the second object from among the multiple real objects of the second image. For example, the processor 210 may recognize the second real object by identifying, via the sensor 230, a color of the second real object, a background of the second real object, and/or motion of the second real object.

According to an embodiment of the disclosure, in operation 730, the processor 210 may generate second object data for the recognized second object 310. In an embodiment of the disclosure, the second object data may include information on the second object 310 among multiple objects in the acquired second image. For example, the second object data may include the second object 310 information and second content classification information of the second object.

According to an embodiment of the disclosure, the second content classification information may include information obtained by categorizing and classifying, based on the second object data, the second object included in the second image into multiple levels.

The first content classification information may refer to the content classification information 519 of FIGS. 4 and 5.

According to an embodiment of the disclosure, information of the second object 310 may include color information of the second object 310. According to an embodiment of the disclosure, the second object data may further include information on the gaze of the user with respect to the second object 310. For example, the information on the gaze of the user with respect to the second object 310 may include information on a time in which the user of the augmented reality device 100 gazes at the second object 310 and/or information on a frequency at which the user gazes at the second object 310.

The information on the second object data has been described by taking an apple as an example, but is not limited thereto. For example, if the second object is a smartphone, the second object data may include a type of the smartphone (e.g., electronic device), a color of the smartphone (e.g., black), and a time in which the user gazes at the smartphone. For another example, if the second object is a pencil, the second object data may include a type of pencil (e.g., writing instruments), a color of the pencil (e.g., blue), and a time in which the user gazes at the pencil.

According to an embodiment of the disclosure, time and frequency have been described as examples, but the disclosure is not limited thereto. The information on the gaze of the user may further include a period during which the user gazes at the second object.

A specific embodiment of the disclosure of the second object data may refer to the first object data of FIGS. 4 and 5.

According to an embodiment of the disclosure, in operation 740, the processor 210 may acquire second priority data generated based on the second object data. In an example, the processor 210 may acquire the second priority data including priority information on the second content classification information, which is generated based on the second object data.

In other words, according to an embodiment of the disclosure, the second priority data may include a priority for the second content classification information. For example, the second priority data may include information obtained by ranking, based on the second object data, each piece of content classification information to which each of objects belongs.

According to an embodiment of the disclosure, in operation 750, the processor 210 may select a second object of interest from among at least one object included in the second image acquired using the camera 220, based on the acquired second priority data. In an example, the processor 210 may select the second object of interest belonging to the content classification information having a highest priority from among multiple pieces of content classification information, based on the second priority data. In other words, in operation 750, the processor 210 may select the second object of interest, in which the user of the augmented reality device 100 is most interested, based on the second priority data.

According to an embodiment of the disclosure, the second object of interest may be an object substantially different from the recognized second object among the multiple objects of the second image. As another example, the second object of interest may be substantially the same object as the second object.

According to an embodiment of the disclosure, in operation 760, the processor 210 may identify a main object of interest having a higher priority value among the first object of interest and the second object of interest, based on the first object data and the second object data.

According to an embodiment of the disclosure, the priority value may include time values recognized by the user with respect to the first object of interest and the second object of interest. For example, if a gaze time value of the first object of interest stored in the first object data is 50 hours and a gaze time value of the second object of interest stored in the second object data is 100 hours, the processor 210 may identify the second object of interest as the main object of interest. In other words, the processor 210 may identify that the user is more interested in the second object of interest than the first object of interest.

Table 2 is an example of an object of interest the priority of which changes.

According to an embodiment of the disclosure, a state before gaze is a state before gazing at a new object, and may refer to a state in which the first image is captured. According to an embodiment of the disclosure, a state after gaze is a state after gazing at a new object, and may refer to a state in which the second image is captured.

TABLE 2

| Priority | State before gaze | State after gaze |
| --- | --- | --- |
| 1 | Ice cream | Doll |
| 2 | Glasses | Coffee |
| 3 | Hair style | Mask |
| 4 | Coffee | Cold noodles |
| 5 | Alcohol | Ice cream |

Referring to Table 2 according to an embodiment of the disclosure, the priority of the object of interest may change as the user gazes a new object. In an example, the first object of interest before gazing at the new object may be selected as ice cream, and the second object of interest after gazing at the new object may be selected as the doll. According to an embodiment of the disclosure, a time value for the second object of interest (e.g., doll) has a larger value than a time value for the first object of interest (e.g., ice cream) after gazing at the new object, and accordingly the priority of the doll may be higher than the priority of the ice cream.

According to an embodiment of the disclosure, in operation 771, if the main object of interest is the second object of interest, the processor 210 may display a second augmented reality content including information on the second object of interest.

According to an embodiment of the disclosure, the second augmented reality content may include the second object of interest and additional information on the second object of interest. In an example, the second augmented reality content may include information of the second object of interest and/or information of another object belonging to the content classification information substantially the same as that of the second object of interest.

The second augmented reality content may refer to the first augmented reality content of FIG. 4.

According to an embodiment of the disclosure, in operation 772, if the main object of interest is the first object of interest, the processor 210 may display a first augmented reality content including information on the first object of interest.

According to an embodiment of the disclosure, the processor 210 may identify the main object of interest having a high priority from among the first object of interest and the second object of interest via the priority values, and accordingly the augmented reality device 100 may provide the user with only an augmented reality content for the object of interest or the augmented reality object preferred by the user.

According to an embodiment of the disclosure, by exposing only an augmented reality content, in which the user is most interested, on the display 240, the augmented reality device 100 may selectively provide only information desired by the user and may exclude unnecessary information. Based on this, experiences of the user using the augmented reality device 100 may be increased.

Figure 8:
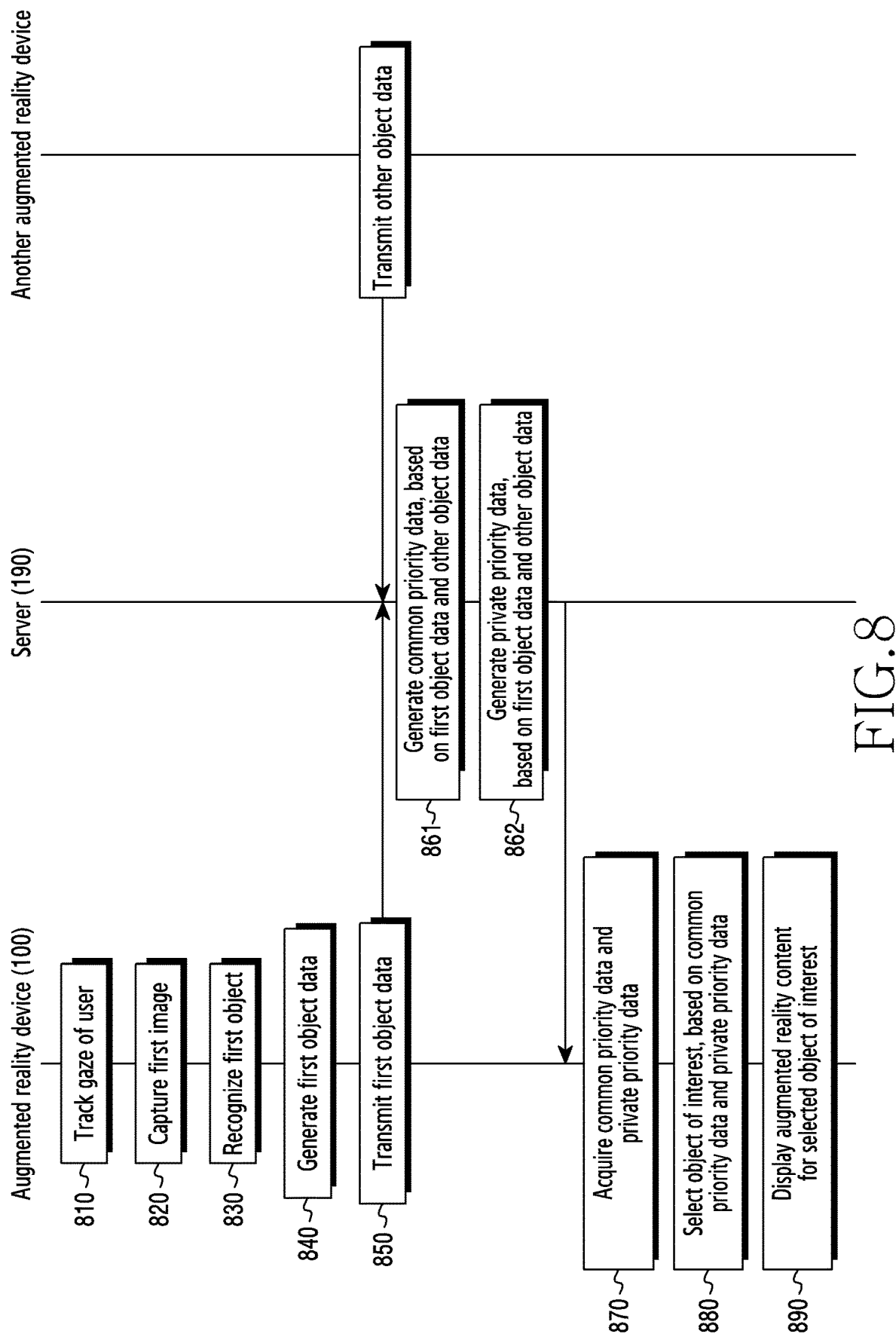
FIG. 8 is a diagram illustrating an electronic device and a server according to an embodiment of the disclosure.

FIG. 8 is a diagram illustrating an electronic device and a server according to an embodiment of the disclosure.

Referring to FIG. 8, according to an embodiment of the disclosure, the augmented reality device 100 may generate and acquire priority data by sharing object data with the server 190.

According to an embodiment of the disclosure, the augmented reality device 100 may transmit information to and receive information from another augmented reality device or the server 190 via the communication module 260.

According to an embodiment of the disclosure, in operation 810, the processor 210 may track a gaze of a user of the augmented reality device 100 by using the sensor 230.

According to an embodiment of the disclosure, in operation 820, the processor 210 may capture a first image in a gaze direction by using the camera 220.

According to an embodiment of the disclosure, in operation 830, the processor 210 may recognize a first object 310 included in the captured first image.

According to an embodiment of the disclosure, in operation 840, the processor 210 may generate first object data 510 for the recognized first object 310.

According to an embodiment of the disclosure, operations 810 to 840 of FIG. 8 may refer operations 410 to 440 of FIG. 4.

According to an embodiment of the disclosure, the processor may further include an operation 850 of transmitting the generated first object data 510 to the server 190. For example, the processor 210 may transmit the first object data 510 to the server 190 via the communication module 260.

According to an embodiment of the disclosure, in operation 861, the server 190 may generate common priority data from the first priority data, based on the first object data received from the processor 210. For example, the server 190 may generate common priority data of the user of the augmented reality device, based on common input information (e.g., gender, and age) of the user of the augmented reality device 100.

According to an embodiment of the disclosure, the server 190 may also receive other object data of a user of another augmented reality device. For example, the server 190 may receive other object data including common input information (e.g., gender and age) of a user of another augmented reality device.

According to an embodiment of the disclosure, the server 190 may generate first priority data of the user of the augmented reality device 100, based on the common input information of the user of the augmented reality device 100 and a user of another augmented reality device.

According to an embodiment of the disclosure, in operation 862, the server 190 may generate private priority data from the first priority data, based on the common priority data and the first object data received from the processor 210. For example, the server 190 may generate the private priority data, based on time information for recognition of the object, which is stored in the first object data.

According to an embodiment of the disclosure, it has been described that the private priority data is generated by the server 190, the disclosure is not limited thereto. For example, the processor 210 of the augmented reality device 100 may receive the common priority data from the server, and may generate the private priority data, based on the received common priority data and the first object data 510.

According to an embodiment of the disclosure, the common priority data and the private priority data may refer to the common priority data and the private priority data of FIG. 6.

According to an embodiment of the disclosure, in operation 870, the processor 210 may acquire, from the server, the first priority data generated based on the transmitted first object data.

According to an embodiment of the disclosure, in operation 880, the processor 210 may select, based on the acquired first priority data, an object of interest from among at least one object included in the first image acquired using the camera 220. The object of interest may be an object different from the recognized first object among the multiple objects of the first image. As another example, the object of interest may be substantially the same object as the first object.

According to an embodiment of the disclosure, in operation 890, the processor 210 may display an augmented reality content for the selected object of interest.

According to an embodiment of the disclosure, the augmented reality content may include the first object of interest and additional information on the first object of interest. In an example, the augmented reality content may include information of the first object of interest and/or information of another object belonging to the content classification information substantially the same as that of the first object of interest.

According to an embodiment of the disclosure, operations 880 and 890 of FIG. 8 may refer to operations 460 and 470 of FIG. 4.

Figure 9:
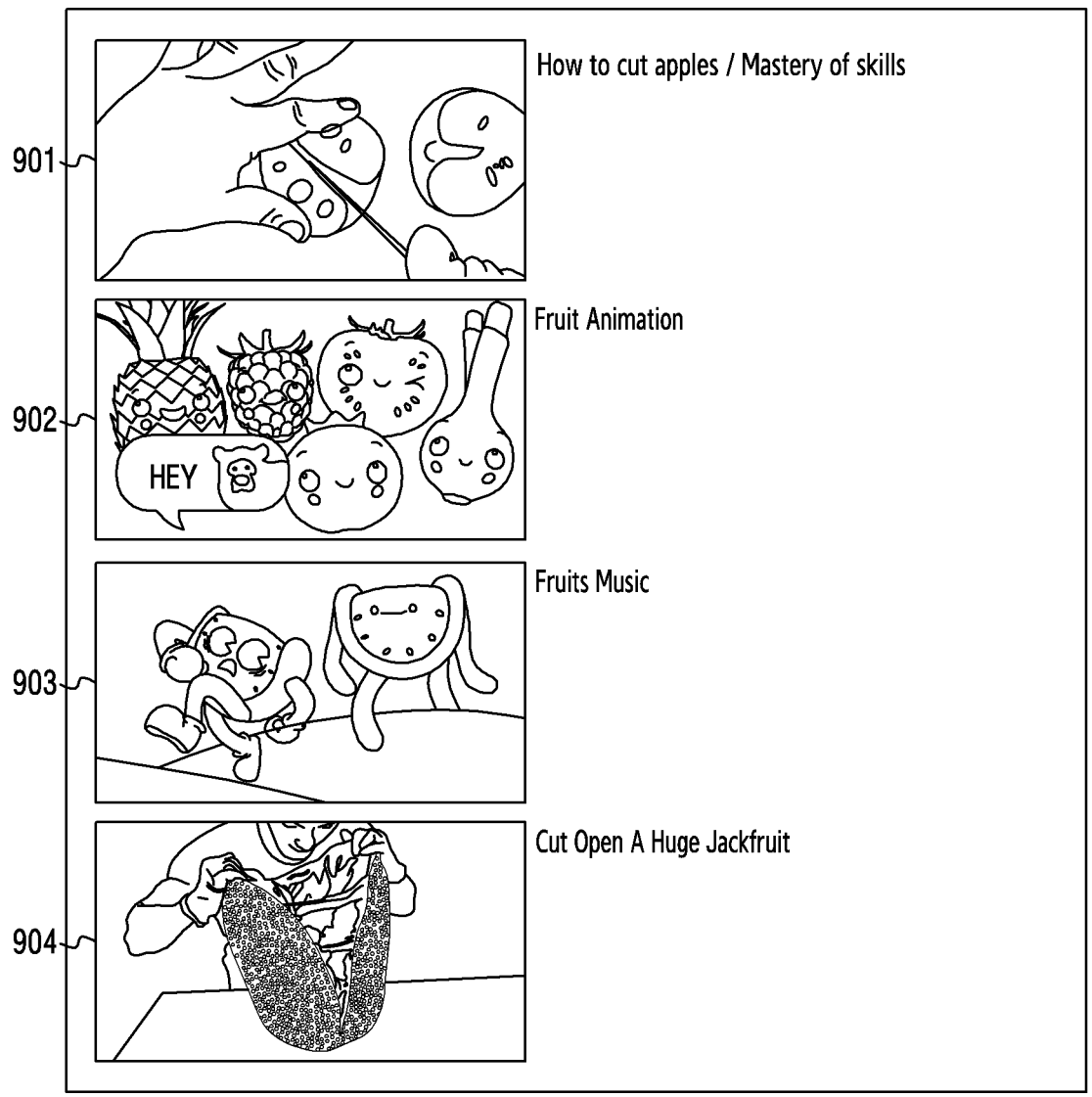
FIG. 9 is a diagram illustrating an augmented reality content according to an embodiment of the disclosure.

FIG. 9 is a diagram illustrating a displayed augmented reality content according to an embodiment of the disclosure.

Referring to FIG. 9, according to an embodiment of the disclosure, the processor 210 may select only a first object of interest of a user having a high priority from among multiple objects, and may expose, on the display 240, only an augmented reality content related to the selected first object of interest.

An augmented reality content 900 may refer to the augmented reality content 320 of FIG. 3.

According to an embodiment of the disclosure, the augmented reality content 900 may include the first object of interest and additional information on the first object of interest.

According to an embodiment of the disclosure, the processor 210 may expose only the object of interest of the user on the display 240. In an example, the processor 210 may expose the augmented reality content 900 related to the first object of interest, in which the user is most interested, on the display 240. For example, if an apple is selected as the first object of interest, the processor 210 may display the augmented reality content 900 related to an apple and fruit on the display 240.

Referring to FIG. 9 according to an embodiment of the disclosure, if an apple is selected as the first object of interest, the processor 210 may display the augmented reality content 900 related to an apple or fruit. For example, if an apple is selected as the first object of interest, the processor 210 may display a first augmented reality content 901 relating to a method of cutting an apple. For example, the processor 210 may display a second augmented reality content 902 related to an animation associated with an apple or fruit. For example, the processor 210 may display a third augmented reality content 903 related to music associated with fruit. For example, the processor 210 may display a fourth augmented reality content 904 related to fruit (e.g., jackfruit) other than an apple.

According to an embodiment of the disclosure, by exposing only an augmented reality content, in which the user is most interested, on the display 240, the processor 210 may selectively provide only information desired by the user and may exclude unnecessary information. Based on this, experiences of the user using the augmented reality device 100 may be increased.

Figure 10:
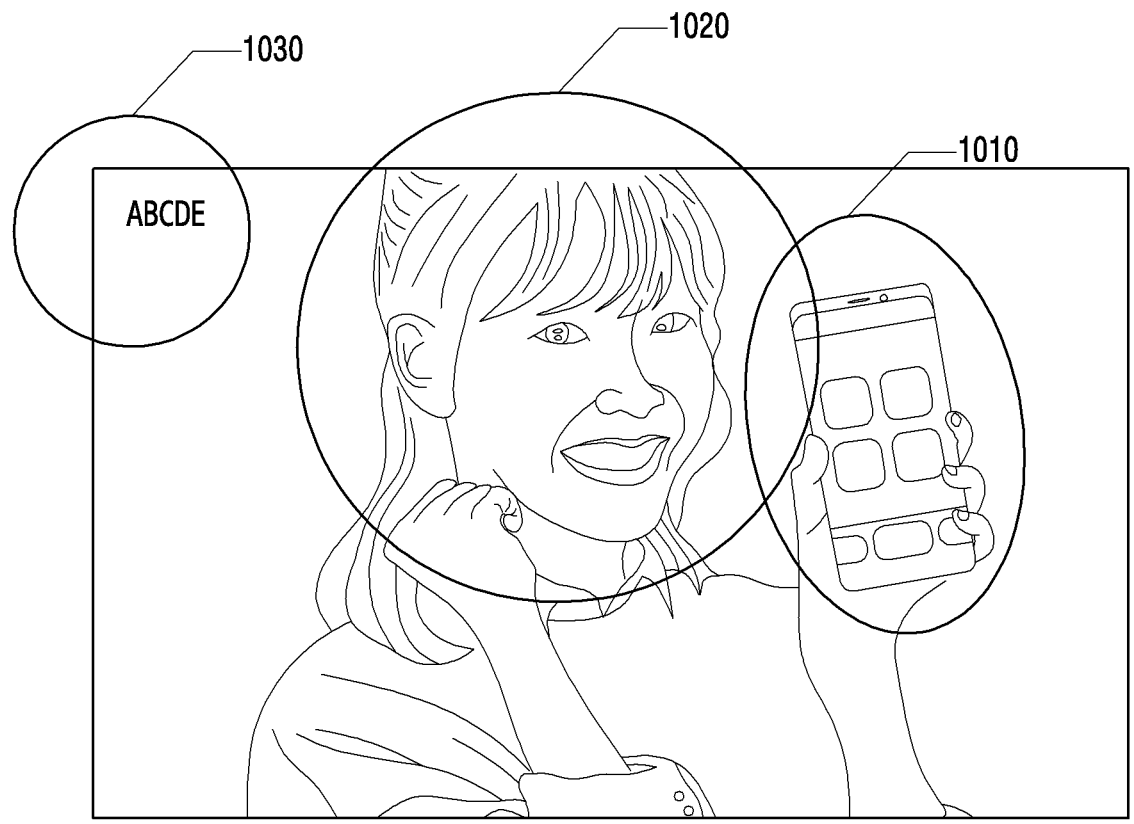
FIG. 10 a diagram illustrating an augmented reality content according to an embodiment of the disclosure.

FIG. 10 is a diagram illustrating displayed an augmented reality content according to an embodiment of the disclosure.

Referring to FIG. 10, according to an embodiment of the disclosure, it illustrates that an augmented reality content 1000 including information on a selected first object of interest 1010 is displayed. In an example, the augmented reality content 1000 may include an advertisement image for the first object of interest 1010. For example, if the first object of interest 1010 is a smartphone, the augmented reality content 1000 may include an image advertising the smartphone.

According to an embodiment of the disclosure, the processor 210 may additionally determine, based on third object data, whether to expose the augmented reality content 1000 displayed on the display 240. In an example, the third object data may include information obtained by detecting a gaze of a user by using the sensor 230. For example, the third object data may include a focal area of the user's gaze and a time in which the user gazes at the first object of interest 1010 in the augmented reality content 1000.

According to an embodiment of the disclosure, the third object data has been described by taking, as an example, information obtained by detecting a gaze, but is not limited thereto. For example, the object data may further include user location information and information on whether audio is on/off. As another example, the third object data may include image brightness and transparency information configured by the user.

According to an embodiment of the disclosure, the processor 210 may identify, based on the third object data, the user's level of interest in the displayed augmented reality content 1000. For example, if the user's focal area is located on a character 1020 while the augmented reality content 1000 of FIG. 10 is being provided, the processor 210 may identify that the user's level of interest in the corresponding augmented reality content 1000 is low. In another example, if the user configures the audio to be on while the augmented reality content 1000 of FIG. 10 is being provided, the processor 210 may identify that the user's level of interest in the corresponding augmented reality content 1000 is high.

According to an embodiment of the disclosure, the processor 210 that has identified the user's level of interest may additionally determine whether to continuously expose the augmented reality content 1000 on the display 240. According to an embodiment of the disclosure, if the processor 210 identifies that the user's level of interest is low, an interface for skipping of an advertisement image may be provided on the display. As another example, if the user's level of interest is determined to be high, the processor 210 may provide an additional advertisement image related to the advertisement image on the display.

According to an embodiment of the disclosure, the processor 210 may expose, with the augmented reality content 1000, information configured by a third party other than the user of the augmented reality device 100. For example, if a third party is a producer of an advertisement image, the third party may configure the brightness of a partial area 1030 of the advertisement image to be exposed differently from other areas of the advertisement image. As another example, the processor 210 may display the color of the partial area 1030 of the advertisement image to be exposed differently from the color of the other areas. As another example, the processor 210 may expose and display a logo of an object to be advertised in the background of the advertisement image.

According to an embodiment of the disclosure, the augmented reality device 100 may provide the augmented reality content 320 preferred by the user, while concurrently providing additional information desired by the third party.

Figure 11:
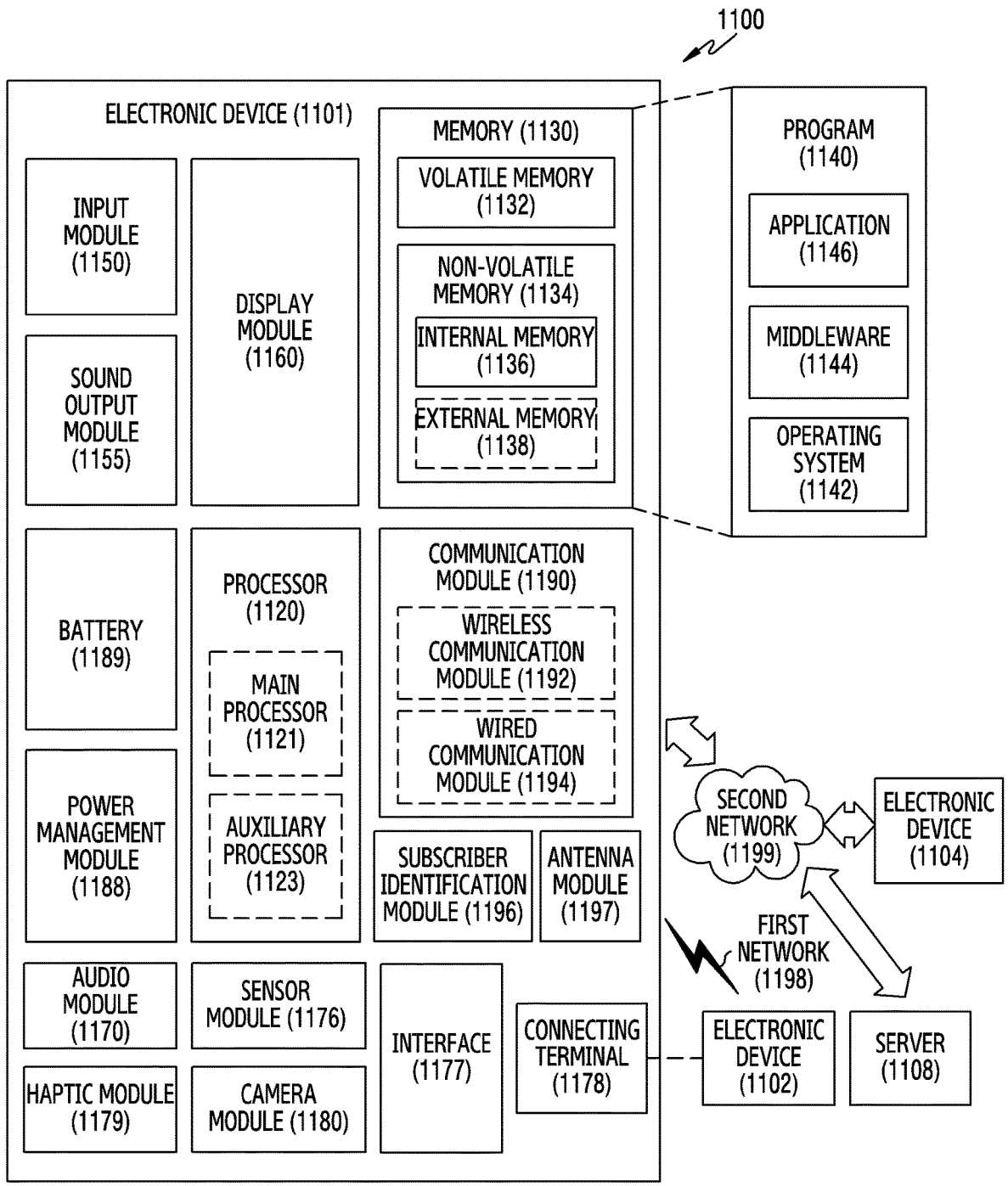
FIG. 11 is a diagram illustrating an electronic device within a network environment according to an embodiment of the disclosure.

FIG. 11 is a block diagram illustrating an electronic device in a network environment according to an embodiment of the disclosure.

Referring to FIG. 11, an electronic device 1101 in the network environment 1100 may communicate with an external electronic device 1102 via a first network 1198 (e.g., a short-range wireless communication network), or at least one of an external electronic device 1104 or a server 1108 via a second network 1199 (e.g., a long-range wireless communication network). According to an embodiment of the disclosure, the electronic device 1101 may communicate with the external electronic device 1104 via the server 1108. According to an embodiment of the disclosure, the electronic device 1101 may include a processor 1120, a memory 1130, an input module 1150, a sound output module 1155, a display module 1160, an audio module 1170, a sensor module 1176, an interface 1177, a connecting terminal 1178, a haptic module 1179, a camera module 1180, a power management module 1188, a battery 1189, a communication module 1190, a subscriber identification module (SIM) 1196, or an antenna module 1197. In some embodiments of the disclosure, at least one of the components (e.g., the connecting terminal 1178) may be omitted from the electronic device 1101, or one or more other components may be added in the electronic device 1101. In some embodiments of the disclosure, some of the components (e.g., the sensor module 1176, the camera module 1180, or the antenna module 1197) may be implemented as a single component (e.g., the display module 1160).

The processor 1120 may execute, for example, software (e.g., a program 1140) to control at least one other component (e.g., a hardware or software component) of the electronic device 1101 coupled with the processor 1120, and may perform various data processing or computation. According to one embodiment of the disclosure, as at least part of the data processing or computation, the processor 1120 may store a command or data received from another component (e.g., the sensor module 1176 or the communication module 1190) in a volatile memory 1132, process the command or the data stored in the volatile memory 1132, and store resulting data in a non-volatile memory 1134. According to an embodiment of the disclosure, the processor 1120 may include a main processor 1121 (e.g., a central processing unit (CPU) or an application processor (AP)), or an auxiliary processor 1123 (e.g., a graphics processing unit (GPU), a neural processing unit (NPU), an image signal processor (ISP), a sensor hub processor, or a communication processor (CP)) that is operable independently from, or in conjunction with, the main processor 1121. For example, when the electronic device 1101 includes the main processor 1121 and the auxiliary processor 1123, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display module 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment of the disclosure, the auxiliary processor 1123 (e.g., an image signal processor or a communication processor) may be implemented as part of another component (e.g., the camera module 1180 or the communication module 1190) functionally related to the auxiliary processor 1123. According to an embodiment of the disclosure, the auxiliary processor 1123 (e.g., the neural processing unit) may include a hardware structure specified for artificial intelligence model processing. An artificial intelligence model may be generated by machine learning. Such learning may be performed, e.g., by the electronic device 1101 where the artificial intelligence is performed or via a separate server (e.g., the server 1108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by another component (e.g., the processor 1120) of the electronic device 1101, from the outside (e.g., a user) of the electronic device 1101. The input module 1150 may include, for example, a microphone, a mouse, a keyboard, a key (e.g., a button), or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment of the disclosure, the display module 1160 may include a touch sensor adapted to detect a touch, or a pressure sensor adapted to measure the intensity of force incurred by the touch.

The audio module 1170 may convert a sound into an electrical signal and vice versa. According to an embodiment of the disclosure, the audio module 1170 may obtain the sound via the input module 1150, or output the sound via the sound output module 1155 or a headphone of an external electronic device (e.g., the external electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment of the disclosure, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the external electronic device 1102) directly (e.g., wiredly) or wirelessly. According to an embodiment of the disclosure, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the external electronic device 1102). According to an embodiment of the disclosure, the connecting terminal 1178 may include, for example, a HDMI connector, a USB connector, an SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1179 may include, for example, a motor, a piezoelectric element, or an electric stimulator.

The camera module 1180 may capture a still image or moving images. According to an embodiment of the disclosure, the camera module 1180 may include one or more lenses, image sensors, image signal processors, or flashes.

The power management module 1188 may manage power supplied to the electronic device 1101. According to one embodiment of the disclosure, the power management module 1188 may be implemented as at least part of, for example, a power management integrated circuit (PMIC).

The battery 1189 may supply power to at least one component of the electronic device 1101. According to an embodiment of the disclosure, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the external electronic device 1102, the external electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment of the disclosure, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The wireless communication module 1192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1192 may support a high-frequency band (e.g., the mmWave band) to achieve, e.g., a high data transmission rate. The wireless communication module 1192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1192 may support various requirements specified in the electronic device 1101, an external electronic device (e.g., the external electronic device 1104), or a network system (e.g., the second network 1199). According to an embodiment of the disclosure, the wireless communication module 1192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1197 may transmit or receive a signal or power to or from the outside (e.g., the external electronic device) of the electronic device 1101. According to an embodiment of the disclosure, the antenna module 1197 may include an antenna including a radiating element including a conductive material or a conductive pattern formed in or on a substrate (e.g., a printed circuit board (PCB)). According to an embodiment of the disclosure, the antenna module 1197 may include a plurality of antennas (e.g., array antennas). In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment of the disclosure, another component (e.g., a radio frequency integrated circuit (RFIC)) other than the radiating element may be additionally formed as part of the antenna module 1197.

According to various embodiments of the disclosure, the antenna module 1197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1101 and the external electronic device 1104 via the server 1108 coupled with the second network 1199. Each of the external electronic devices 1102 or 1104 may be a device of a same type as, or a different type, from the electronic device 1101. According to an embodiment of the disclosure, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, mobile edge computing (MEC), or client-server computing technology may be used, for example. The electronic device 1101 may provide ultra low-latency services using, e.g., distributed computing or mobile edge computing. In another embodiment of the disclosure, the external electronic device 1104 may include an internet-of-things (IoT) device. The server 1108 may be an intelligent server using machine learning and/or a neural network. According to an embodiment of the disclosure, the external electronic device 1104 or the server 1108 may be included in the second network 1199. The electronic device 1101 may be applied to intelligent services (e.g., smart home, smart city, smart car, or healthcare) based on 5G communication technology or IoT-related technology. An augmented reality device according to various embodiments may include a display, a camera, a sensor, and a processor operatively connected to the display, the sensor, and the camera, wherein the processor is configured to detect a gaze direction of a user by using the sensor, capture a first image in the gaze direction of the user by using the camera, recognize a first object included in the captured first image, generate first object data including first content classification information to which the recognized first object belongs, acquire, based on the first object data, first priority data including a priority for the first content classification information, select, based on the acquired first priority data, a first object of interest among at least one object included in the first image acquired using the camera, and display a first augmented reality content including information on the selected first object of interest.

According to various embodiments of the disclosure, an augmented reality device may include a display, a sensor, a camera, and a processor operatively connected to the display, the sensor, and the camera, wherein the processor is configured to detect a gaze of a user by using the sensor, acquire a first image in a tracked gaze direction of the user by using the camera, generate objects in the acquired first image and first object data related to the gaze of the user with respect to the objects, transmit the generated first object data to a server, receive, from the server, common priority data generated by the server, based on the first object data provided to the server from the augmented reality device and other object data provided to the server from at least one other augmented reality device, generate private (individualized) priority data for the user of the augmented reality device from the common priority data by using the first object data generated by the augmented reality device, select, based on the private priority data, a first object of interest of the user from among the objects in the first image, and display an augmented reality content including the first object of interest and additional information on the first object of interest.

According to an embodiment of the disclosure, the first object data may include a frequency at which the user recognizes the first object, a time in which the user recognizes the first object, and/or a period during which the user recognizes the first object.

According to an embodiment of the disclosure, the priority data may include a frequency at which the first object is recognized, a time in which the first object is recognized, and/or information obtained by ranking the first content classification information, based on the frequency at which the first object is recognized.

According to an embodiment of the disclosure, the first content classification information may be obtained by categorizing and classifying each of multiple objects in the first image into multiple levels.

According to an embodiment of the disclosure, the first priority data may include common priority data and private priority data, the common priority data may include priority information determined based on input information of the user of the augmented reality device and another user of another external device, and the private priority data may include a time in which the user of the augmented reality device has recognized the first object.

According to an embodiment of the disclosure, the first priority data may further include exposure information on the display with respect to content classification information, and the exposure information on the display may include the age of the user of the augmented reality device and exposure blocking information input to the augmented reality device by the user.

According to an embodiment of the disclosure, the first augmented reality content may include information on the first object and/or information on a second object belonging to the first content classification information substantially the same as that of the first object.

According to an embodiment of the disclosure, the processor may be configured to capture a second image in the gaze direction of the user by using the camera, recognize a second object included in the captured second image, additionally generate second object data including second content classification information to which the recognized second object belongs, acquire, based on the second object data, second priority data including a priority of the second content classification information, select, based on the acquired second priority data, a second object of interest among at least one object included in the second image acquired using the camera, identify a main object of interest having a higher priority value among the first object of interest and the second object of interest, the priority value including time values for the user recognizing the first object of interest and the second object of interest, and display a second augmented reality content including information associated with the second object of interest if the second object of interest is selected as the main object of interest.

According to an embodiment of the disclosure, the processor may be configured to transmit the generated first object data to a server, and may acquire, from the server, the first priority data generated based on the transmitted first object data.

According to various embodiments of the disclosure, an augmented reality device may include a display, a sensor, a camera, and a processor operatively connected to the display, the sensor, and the camera, wherein the processor is configured to detect a gaze of a user by using the sensor, acquire a first image in a tracked gaze direction of the user by using the camera, generate objects in the acquired first image and first object data related to the gaze of the user with respect to the objects, transmit the generated first object data to a server, receive, from the server, common priority data generated by the server, based on the first object data provided to the server from the augmented reality device and other object data provided to the server from at least one other augmented reality device, generate private (individualized) priority data for the user of the augmented reality device from the common priority data by using the first object data generated by the augmented reality device, select, based on the private priority data, a first object of interest of the user from among the objects in the first image, and display an augmented reality content including the first object of interest and additional information on the first object of interest.

According to an embodiment of the disclosure, the first object data may include a frequency at which the user recognizes each of the objects in the first image, a time in which the user recognizes each of the objects, and/or a period during which the user recognizes each of the objects.

According to an embodiment of the disclosure, the common priority data and the private priority data may be ranked as objects, in which the user of the augmented reality device is highly interested, from among the objects in the first image by using the first object data.

According to an embodiment of the disclosure, the common priority data may include priority information determined based on input information of the user of the augmented reality device and another user of another augmented reality device.

According to an embodiment of the disclosure, the private priority data may include a time in which the user of the augmented reality device recognizes a first object among the objects in the first image.

According to an embodiment of the disclosure, additional information on the first object of interest may include information on a second object belonging to substantially the same category as that of the first object.

A method of operating an augmented reality device according to various embodiments may include detecting a gaze of a user by using the sensor, acquiring a first image in a tracked gaze direction of the user by using the camera, generating information of real objects in the acquired first image and first object data related to the gaze of the user with respect to the real objects, transmitting the generated first object data to a server, receiving, from the server, common priority data generated by the server, based on the first object data provided to the server from the augmented reality device and other object data provided to the server from at least one other augmented reality device, generating private (individualized) priority data for the user of the augmented reality device from the common priority data by using the object data generated by the augmented reality device, selecting, based on the private priority data, a first object of interest of the user from among the objects in the first image, and displaying an augmented reality content including the first object of interest and additional information on the first object of interest.

According to an embodiment of the disclosure, the first object data may include a frequency at which the user recognizes each of the objects in the first image, a time in which the user recognizes each of the objects, and/or a period during which the user recognizes each of the objects.

According to an embodiment of the disclosure, the common priority data may include priority information determined based on input information of the user of the augmented reality device and another user of another augmented reality device.

According to an embodiment of the disclosure, the private priority data may include a time in which the user of the augmented reality device recognizes a first object among the real objects in the first image.

According to an embodiment of the disclosure, additional information on the first object of interest may include information on a second object belonging to substantially the same category as that of the first object.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1140) including one or more instructions that are stored in a storage medium (e.g., an internal memory 1136 or an external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An augmented reality device comprising:
   a display;
   a camera;
   a sensor; and
   at least one processor operatively connected to the display, the sensor, and the camera,
   wherein the at least one processor is configured to:
      detect a gaze direction of a user of the augmented reality device by using the sensor,
      obtain a first image by capturing at least one object positioned in the gaze direction of the user by using the camera,
      recognize a first object included in the captured first image,
      identify category of the first object,
      identify a first priority data of the identified category, wherein the first priority data comprises rank of each of category and each of the rank is updated based on a frequency at which an object included in the identified category is gazed by the user, a time in which the object included in the identified category is gazed by the user, and a period at which the object included in the identified category is gazed by user,
      based on the acquired first priority data, select a first object of interest that belongs to the highest ranked category among at least one object included in the first image acquired using the camera, and
      display, on the display, a first augmented reality content comprising information associated with the selected first object of interest.

2. The device of claim 1, wherein first content classification information is obtained by categorizing and classifying each of multiple objects in the first image into multiple levels.

3. The device of claim 1,
   wherein the first priority data comprises common priority data and private priority data,
   wherein the common priority data comprises priority information determined based on input information of the user of the augmented reality device and another user of another external device, and
   wherein the private priority data comprises a time in which the user of the augmented reality device has recognized the first object.

4. The device of claim 1,
   wherein the first priority data further comprises exposure information on the display with respect to content classification information, and
   wherein the exposure information on the display comprises the age of the user of the augmented reality device and exposure blocking information input to the augmented reality device by the user.

5. The device of claim 1, wherein the first augmented reality content comprises information on the first object and/or information on a second object belonging to first content classification information substantially a same as that of the first object.

6. The device of claim 1, wherein the at least one processor is further configured to:
   capture a second image in the gaze direction of the user by using the camera,
   recognize a second object included in the captured second image,
   additionally generate second object data comprising second content classification information to which the recognized second object belongs,
   based on the second object data, acquire second priority data comprising a priority of the second content classification information,
   based on the acquired second priority data, select a second object of interest among at least one object included in the second image acquired using the camera,
   identify a main object of interest having a higher priority value among the first object of interest and the second object of interest, wherein the higher priority value comprises time values for the user recognizing the first object of interest and the second object of interest, and
   in case that the second object of interest is selected as the main object of interest, display a second augmented reality content comprising information associated with the second object of interest.

7. The device of claim 1, wherein the at least one processor is further configured to:
   transmit the generated first object data to a server, and
   acquire, from the server, the first priority data generated based on the transmitted first object data.

8. A method of operating an augmented reality device, the method comprising:
- detecting a gaze of a user by using a sensor;
- obtaining a first image by capturing at least one object positioned in a detected gaze direction of the user by using a camera;
- recognizing a first object included in the captured first image,
- identifying category of the first object,
- identifying a first priority data of the identified category, wherein the first priority data comprises rank of each of category and each of the rank is updated based on a frequency at which an object included in the identified category is gazed by the user, a time in which the object included in the identified category is gazed by the user, and a period at which the object included in the identified category is gazed by user,
- based on private priority data, selecting a first object of interest that belongs to the highest ranked category of the user from among real objects in the first image; and
- displaying a first augmented reality content comprising the first object of interest and additional information associated with the first object of interest.

9. The method of claim 8, wherein the additional information associated with the first object of interest comprises information on a second object belonging to substantially the same category as that of the first object.

* * * * *